United States Patent [19]

Kitamura

[11] 4,237,595
[45] Dec. 9, 1980

[54] AUTOMATIC TOOL CHANGING DEVICE FOR A MACHINING CENTER

[76] Inventor: Koichiro Kitamura, 11-5 Ekinan-3-chome, Takaoka-shi, Japan

[21] Appl. No.: 18,224

[22] Filed: Mar. 7, 1979

[30] Foreign Application Priority Data

Jun. 30, 1978 [JP] Japan .................................. 53-78644

[51] Int. Cl.³ .......................... B23B 39/00; B23B 39/20
[52] U.S. Cl. ..................................... 29/26 A; 29/568; 408/35
[58] Field of Search ................. 408/35; 29/26 A, 568

[56] References Cited

U.S. PATENT DOCUMENTS

| | | | |
|---|---|---|---|
| 3,133,349 | 5/1964 | Riedel | 29/568 |
| 3,473,419 | 10/1969 | Ollearo | 408/35 |
| 3,619,898 | 11/1971 | Perry et al. | 29/568 |
| 3,635,569 | 1/1972 | Sato et al. | 408/35 |
| 3,691,899 | 9/1972 | Antonietto et al. | 408/35 |
| 3,987,909 | 10/1976 | Piotrowski | 29/568 |
| 4,135,278 | 1/1979 | Kitamura | 29/26 A |

*Primary Examiner*—Harrison L. Hinson
*Attorney, Agent, or Firm*—Haseltine, Lake & Waters

[57] ABSTRACT

An automatic tool changing device comprises the head of a machining center and a drum vertically movably mounted on the outer end of the head, and rotatably arranged around a center shaft which is projected from the central portion of the drum to slant downwardly are a large number of arms each having an arbor holding portion at the forward end and formed in a predetermined position on the central back surface with an elongated groove adapted for engagement with a geneva drive pin, whereby when one of the arms is engaged with a main shaft or spindle in the head, the remaining arms are continuously arranged on each side of the engaged arm above a position spaced by a predetermined angle therefrom. Disposed on the back side of the arm engaged with the main shaft and the adjacent arms on both sides thereof is a pair of genevas each having the arm moving drive pin selectively engageable with the elongated groove of the adjacent pair of arms, and every rotation or every plurality of rotations of the genevas in the counterclockwise or clockwise direction moves the arms each by an amount corresponding to one arm or a plurality of the arms.

4 Claims, 31 Drawing Figures

28

28

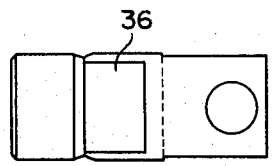
FIG. 9 (B)
FIG. 9 (C)
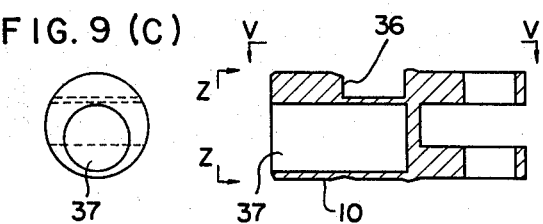
FIG. 9(A)
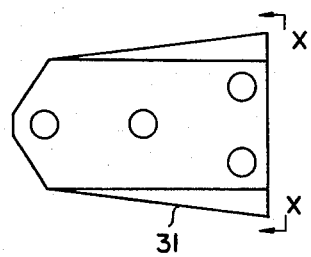
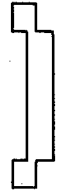
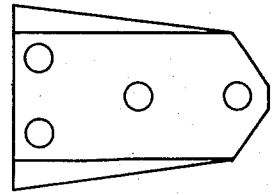
FIG.12(A)  FIG.12(B)  FIG.12(C)

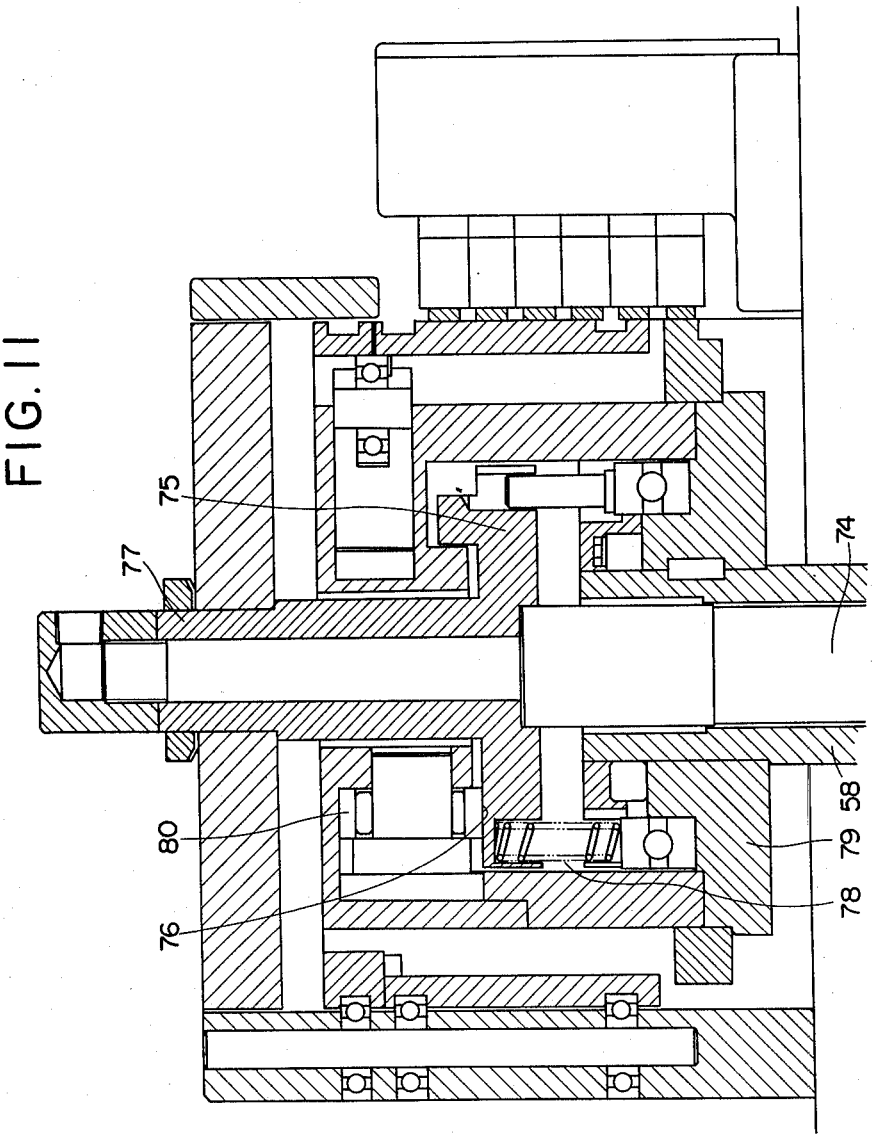

AUTOMATIC TOOL CHANGING DEVICE FOR A MACHINING CENTER

BACKGROUND OF THE INVENTION

The present invention relates to an automatic tool changing device for machining centers such as a numerical control milling machine with an automatic tool changing device.

Two principal types of such device are known in the art. They are a turret head type, and an arm type in which the required tool changes are effected by intermediary means such as an arm and a tool transport unit which are arranged between a tool magazine and the main shaft or spindle of a machine tool. A disadvantage of the former or the turret head type is that while the required tool changing time is relatively short, the number of tools that can be held on the head is usually on the order of 6 to 8 tools thus making it unsuitable for use on machining centers designed to perform a variety of machining operations and moreover there is the disadvantage of causing indexing error, misalignment and the like. The latter or the arm type is also disadvantageous in that since the head carrying a tool must first be raised to a predetermined height to permit the tool change by the intermediary means such as a robot and then the head must be lowered to effect the machining of the work, even in the case of a small-sized work the head must be raised to the predetermined height thus requiring a waste time, wasting time in changing the tools, unavoidably making the device larger and more complicated in construction and making it impossible to use this type of device on machining centers particularly in view of the recent trend in designing toward smaller machining centers.

With a view to overcoming the foregoing deficiencies, the inventor has proposed in U.S. Patent Application Ser. No. 817,529 an automatic tool changing device in which an annular channel is formed in the outer peripheral surface of a drum and a large number of arbors are movably fitted in the annular channel, whereby one of the arbors is engaged with the main shaft of a head and the remaining arbors are continuously arranged along the upper periphery of the drum above a position spaced by a predetermined angle from the engaged arbor on each side thereof. However, this device is also disadvantageous in that the rotation of the arbors for tool changing purposes can be made only by an amount corresponding to one arbor and in one direction only and thus it is impossible to move the arbors in either the counterclockwise direction or the clockwise direction as desired and thereby select the desired tool in a short period time.

SUMMARY OF THE INVENTION

The present invention has been created with a view to overcoming the foregoing deficiencies in the prior art, and thus the invention comprises an automatic tool changing device for machining centers comprising a movable head and a drum vertically movably mounted on the head. The drum comprises a base member mounted so as to be guided by guide rail means on the front part of the movable head, a center shaft mounted to project from the front central portion of the base member to slant downwardly, a large number of inverted angle arms which are radially and rotatably arranged in predetermined positions along the outer surface of the center shaft, each of the arms having an arbor holding portion at the foreward end and provided on the base side central back surface with an elongated groove adapted for engagement with a geneva drive pin and with a cylinder mounted in a predetermined intermediate position to project to the front for engagement with a unused arm connecting rotary plate, said unused arm connecting rotary plate including a semicircular groove which is formed in the outer periphery to receive the cylinders of the closely arranged arms whereby excluding one of the arms engaged with a main shaft provided in the head the cylinders of the remaining arms are received and held so as to arrange the remaining arms continuously above a position spaced by a predetermined angle from the arm engaged with the main shaft on each side thereof, and a pair of genevas arranged symmetrically on the back side of the arms each so as to be positioned between the arm engaged with the main shaft and the adjoining arm on each side thereof and each including an arm moving drive pin adapted for selective engagement with the elongated grooves of the associated pair of the arms whereby every rotation or every plurality of rotations of the genevas in the clockwise or counterclockwise direction moves the arms by an amount corresponding to one arm or a plurality of the arms in the clockwise or counterclockwise direction while maintaining the previous mentioned arrangement.

It is therefore a first object of the invention to make it possible to hold a large number of tools, select any desired one of the tools held in a minimum period of time accurately and greatly improve the tool changing efficiency.

It is a second object of the invention to ensure that after the completion of every tool changing cycle any desired tool can be selected through the shortest route with the drum being held in the lowered position and without raising it.

It is a third object of the invention to provide a device in which tools which are to be used and that which was used are positively placed in positions free of interference with the work, thus ensuring safe machining of the work.

Other objects, features and advantages of the invention will appear more apparent from the following description.

BRIEF DESCRIPTION OF THE DRAWINGS

FIG. 9(A) illustrates a cylinder, in its longitudinal sectional view, FIG. 9(B) a view looked in the direction of an arrow line V—V in FIG. 9(A) and FIG. 9(C) a view looked in the direction of an arrow line Z—Z in FIG. 9(A).

FIG. 11 is a schematic longitudinal view shown in the structure for engaging and desengaging an arbor with a main shaft or spindle.

FIG. 12(A) illustrates one form of an arm level adjusting bracket, in its top view, FIG. 12(B) a view looked in the direction of an arrow line X—X in FIG. 12(A), and FIG. 12(C) its bottom view.

DESCRIPTION OF THE PREFERRED EMBODIMENTS

Figure 1:
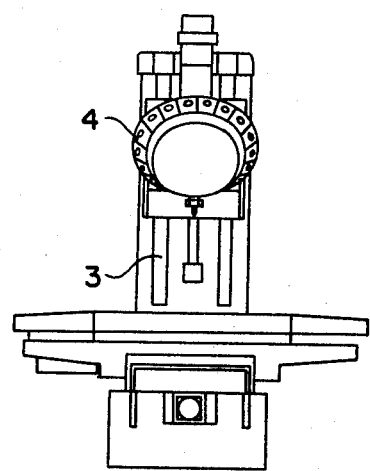
FIG. 1 is a front view of an automatic tool changing device according to the invention, showing the manner in which the device is mounted on a machining center.
Figure 2:
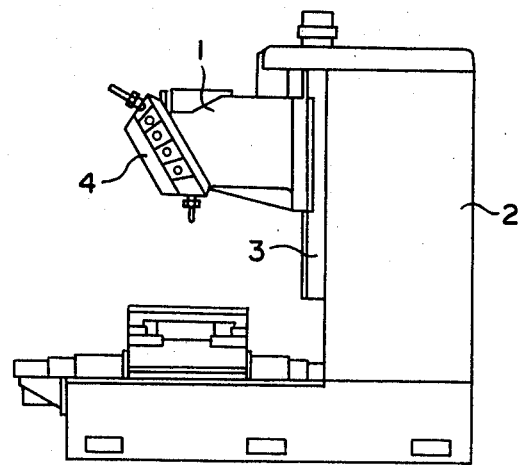
FIG. 2 is a side view of FIG. 1.
Figure 3:
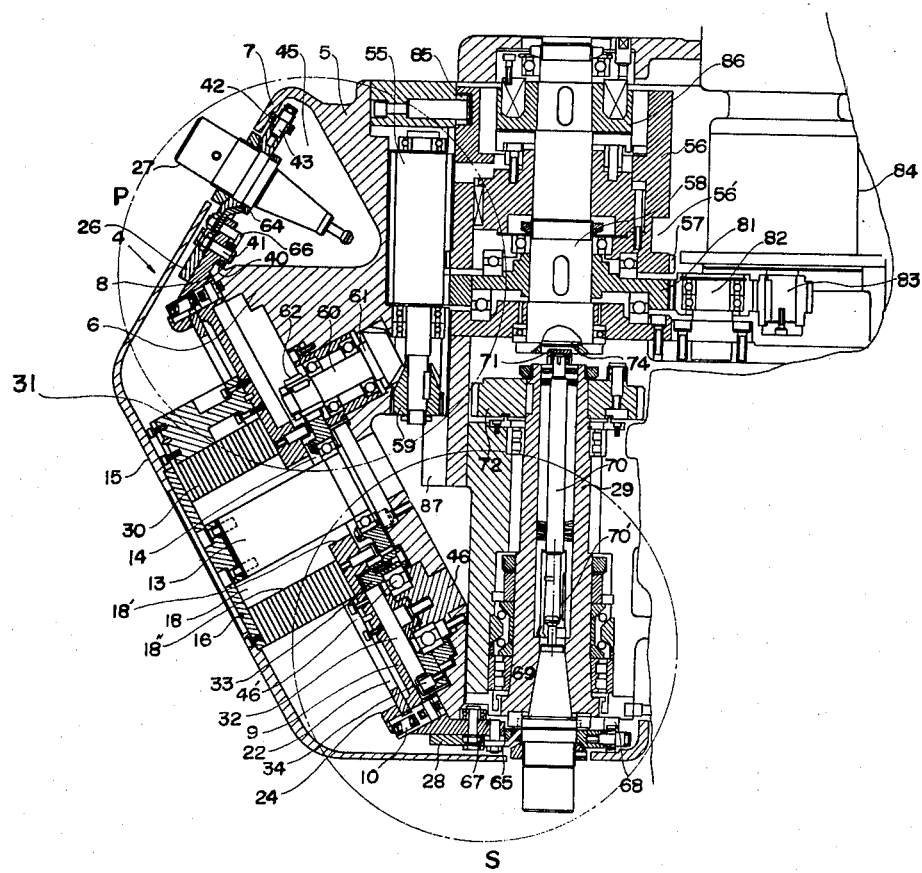
FIG. 3A is a longitudinal sectional view of an embodiment of the invention, FIG. 3B an enlarged view of the section (S), and FIG. 3C and enlarge view of the section (P).
Figure 3:
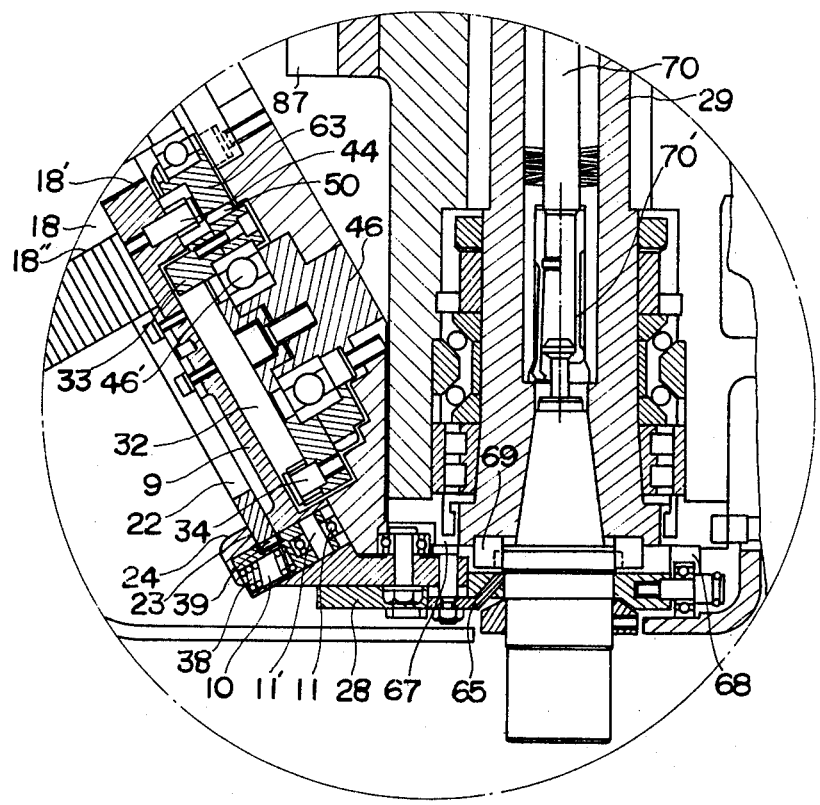
Figure 3:
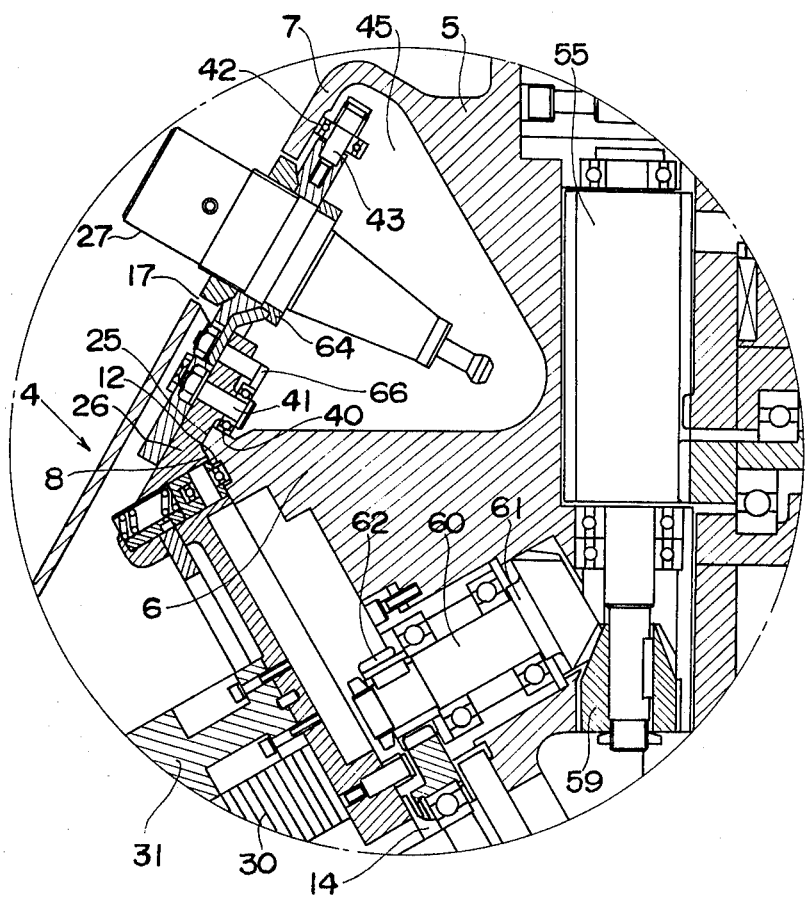
Figure 4A:
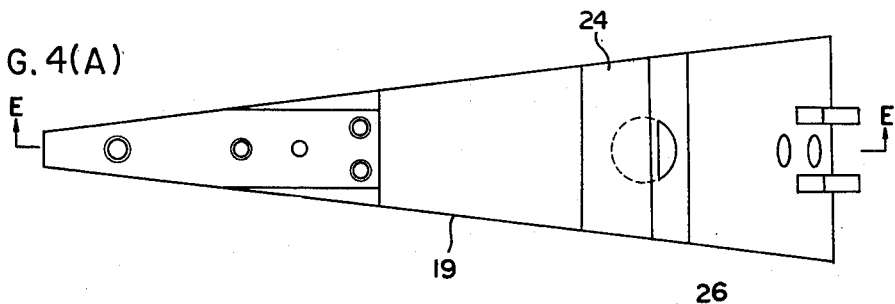
FIG. 4(A) illustrates an arm in enlarged form, in its top view, FIG. 4(B) a view looked in the direction of an arrow line E—E in FIG. 4(A) and FIG. 4(C) its bottom view.
Figure 4B:
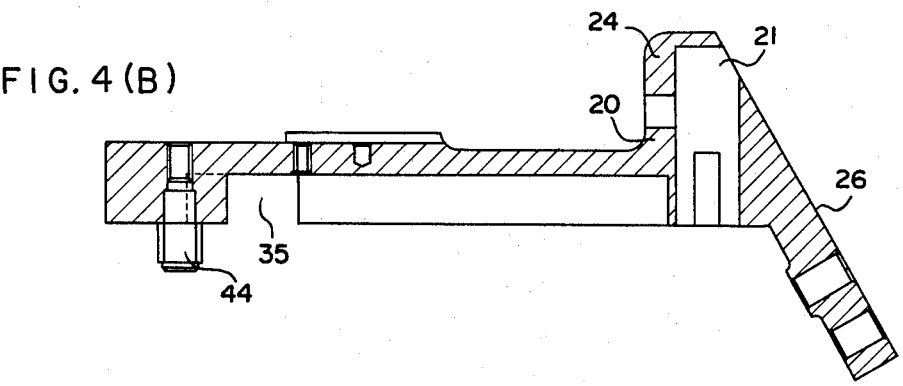
Figure 4C:
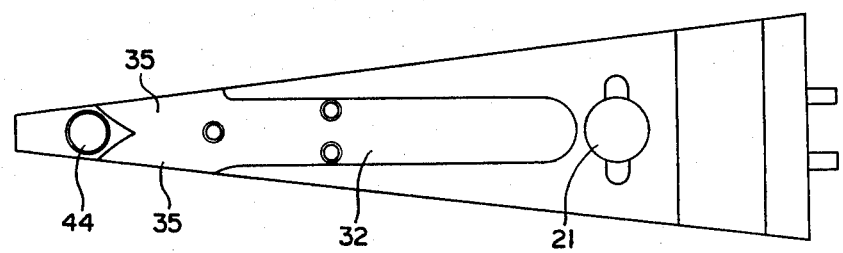
Figure 5:
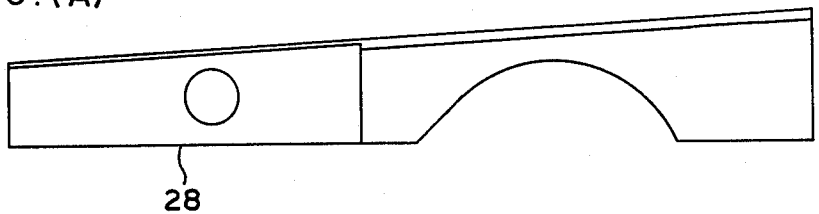
FIG. 5(A) illustrates one of a pair of symmetrical arbor holding pawl piece, in its top view, FIG. 5(B) its side view and FIG. 5(C) its bottom view.
Figure 5B:
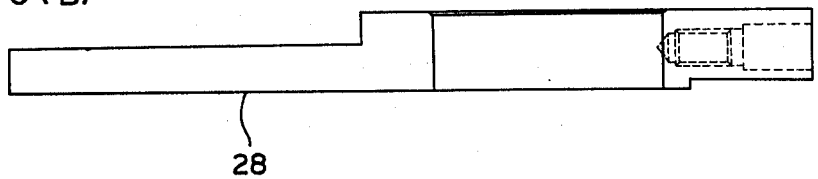
Figure 5C:
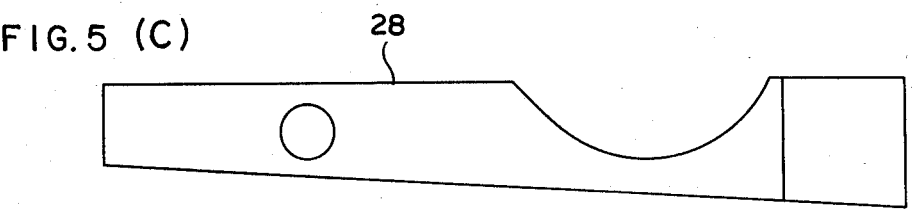
Figure 6:
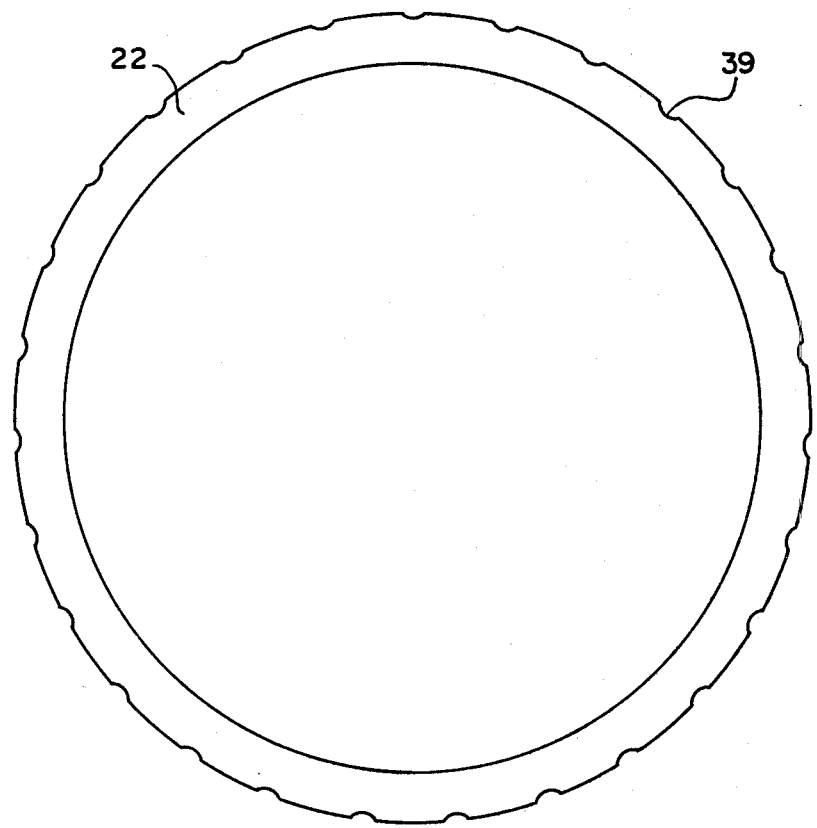
FIG. 6 is a plan view showing a unused arm connecting rotary plate.
Figure 7A:
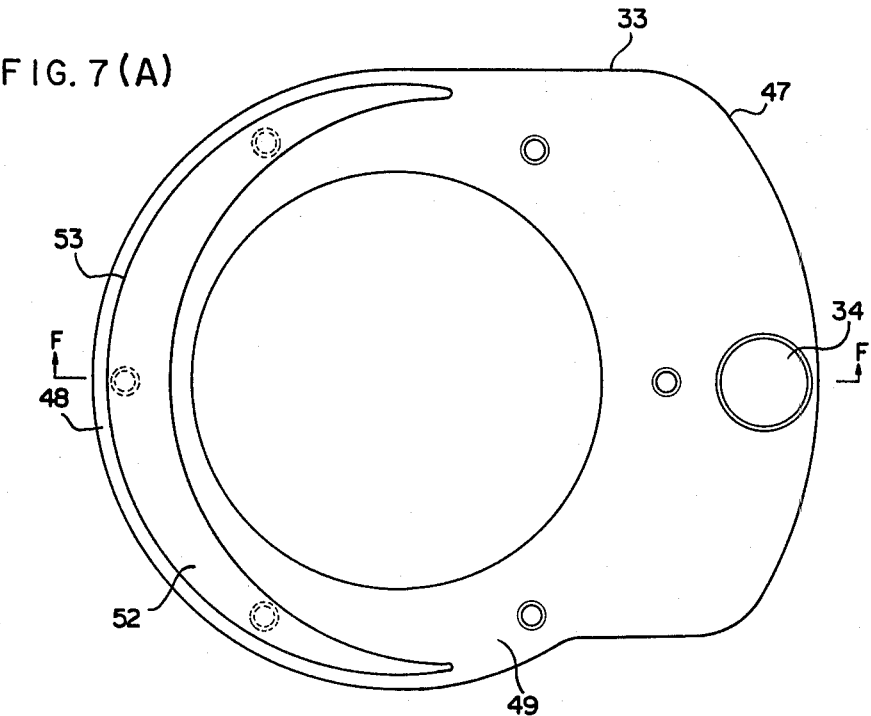
FIG. 7(A) illustrates the principal parts of a geneva, in its bottom view and FIG. 7(B) a partial side sectional view in the direction of an arrow line F—F in FIG. 7(A).
Figure 7B:
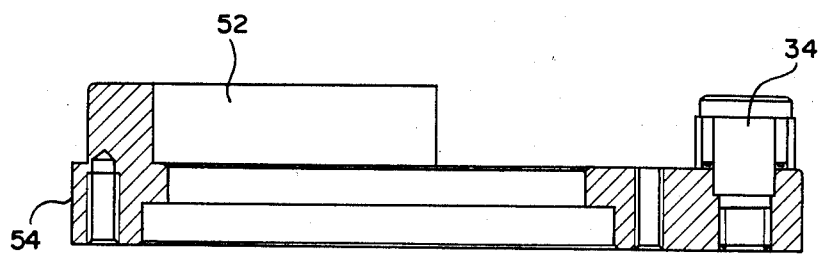
Figure 8:
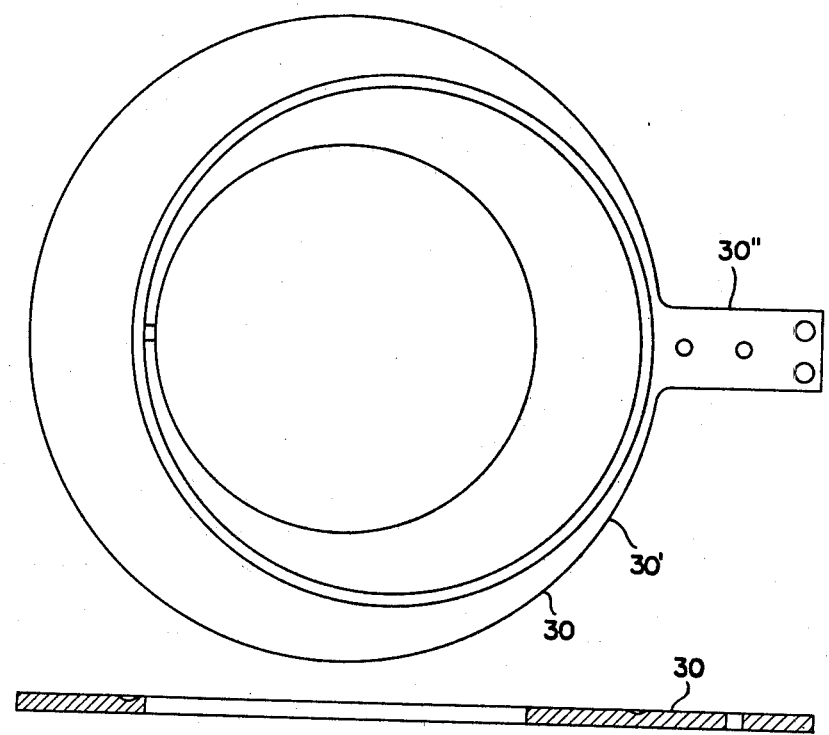
FIG. 8 is a plan view of an annular plate.
Figure 10:
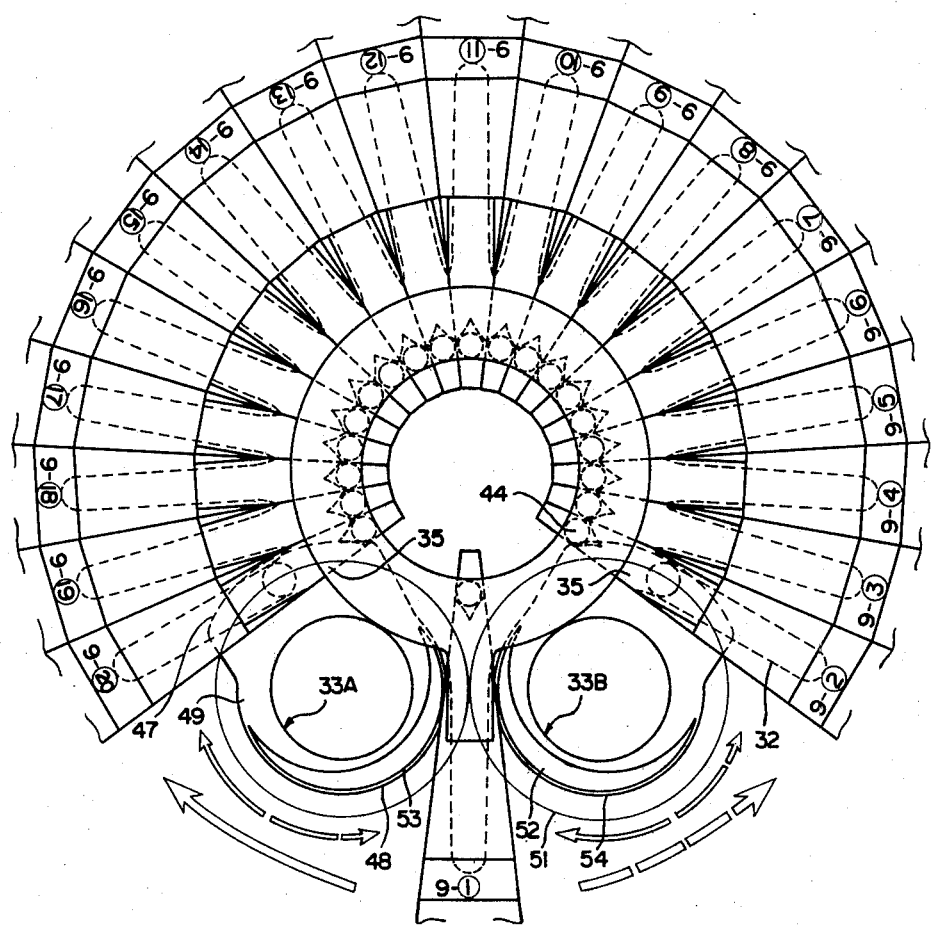
FIG. 10 is a schematic view as viewed from the front of FIG. 3, which is useful in explaining the manner of engagement between the arms and the genevas.
Figure 13C:
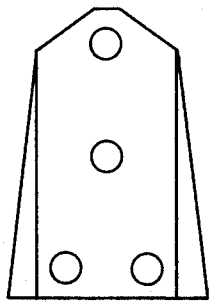
FIG. 13(A) illustrates another form of the level adjusting bracket, in its top view, FIG. 13(B) a view looked in the direction of an arrow line Y—Y in FIG. 13(A), FIG. 13(C) its bottom view and FIG. 13(D) its side view.
Figure 13B:
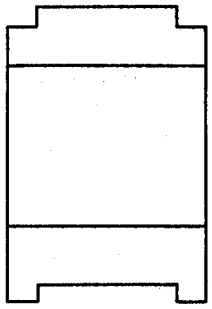
Figure 13A:
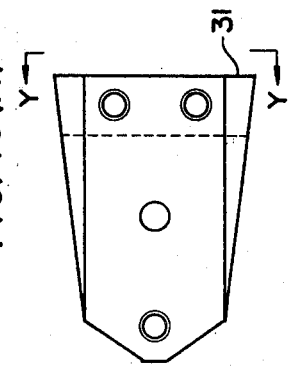
Figure 13D:
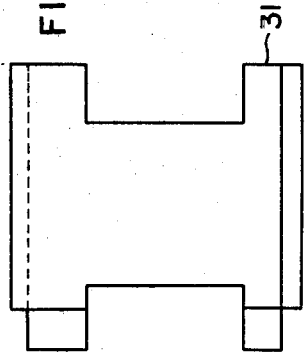
Figure 14A:
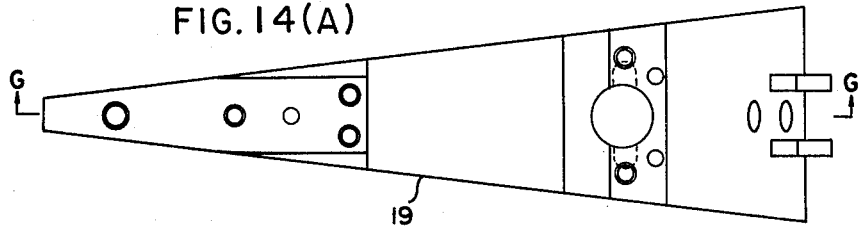
FIG. 14(A) illustrates an arm structure adapted for easy mounting and demounting of a cylinder, in its top view, FIG. 14(B) a partial side sectional view in the direction of an arrow line G—G in FIG. 14(A), and FIG. 14(C) a top view of a cover attached to its projection, FIG. 14(D) a view looked in the direction of an arrow line H—H in FIG. 14(C).
Figure 14B:
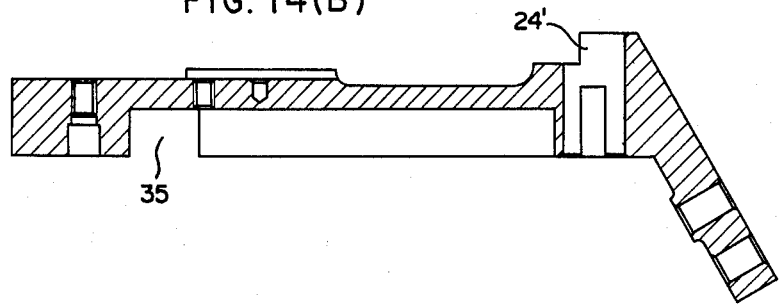
Figure 14C:
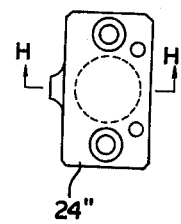
Figure 14D:
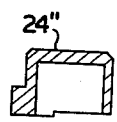

Referring to FIGS. 1 to 14, numeral 1 designates a head mounted on the front part of a column 2 so as to be vertically movable along a pair of guide rails 3, 4 a frustum conical drum mounted on the upper front part of the head 1 so as to be vertically movable in its downwardly slanted position, 5 a drum base portion having a frustum inverted conical portion 6 in its central front part and formed with an annular flange 7 in its outer periphery, and 8 a front wall on the outer periphery of the frustum inverted conical portion 6 which, as shown in the illustration, is provided on the same plane to slant downwardly and formed at its predetermined position in the upper circumferential direction with a major or ⅔ arc guide groove 12 with which is engageable a slide member 11 provided on the upper end of a cylinder 10 which is mounted in a predetermined intermediary position of each arm 9 so as to be always projectable toward the front wall 8.

Numeral 13 designates a center shaft having its base fixedly mounted in the central back side of the frustum inverted conical portion 6 of the drum 4 so as to be projected in a downwardly slanted position from the base to the front, and a collar 14 is provided in a predetermined position on the outer surface of the shaft 13 near its base to have its front positioned on the same plane with the outer peripheral front wall 8 of the frustum inverted conical portion 6. Numeral 15 designates a cover fixedly mounted on the outer end of the center shaft 13 by way of an annular flange 16 and forming the drum front part, 17 a tool holding arbor receiving space defined between the inner peripheral portion of the annular flange 7 and the outer peripheral portion of the cover 15, and 18 a center ring mounted on the outer surface of the center shaft 13 between the lower surface of the collar 14 and the annular flange 16 and formed with a small diameter portion 18' of a predetermined length in its base portion.

Numeral 9 designates a large number of inverted angle arms (20 arms in the illustration) which are radially and rotatably mounted on the outer surface of the center ring small diameter portion 18' between the lower surface of the collar 14 and the upper surface of a center ring large diameter portion 18", and each arm 9 comprises an arm proper of a predetermined length constituting the arm base portion and having a thickness which is equal to the length of the center ring small diameter portion 18', a projection 24 which is extended from an arm proper end 20 to project to the front and having a cylinder receiving groove 21 formed inside thereof to extend through the arm proper end and open to the front wall 8 and a slot 23 communicated with the groove 21 and adapted to receive the outer peripheral edge of an unused arm connecting rotary plate 22, a pawl piece holder 26 of a predetermined length extended in a slanted manner from the arm proper end 20 along an outer wall 25 of the frustum inverted conical portion 6, and pawl pieces 28 fixed to the pawl piece holder 26 to detachably hold a tool holding arbor 27. One of the arms 9 which is holding an arbor 27 engaged with a main shaft or spindle 29 provided in the head 1, that is, the arm 9-① is positioned below the drum 4 and the other arms 9-② to 9-⑳ are continuously arranged above a position spaced by a predetermined angle (60 degrees in the illustration) from the bottom arm 9-① on each side thereof. The angle is preset to such a value that any interference between the arms and a work is prevented.

Numeral 30 designates a large number of annular plates (20 plates in the illustration) adapted to engage the hold the base lower surface of the respective arms 9 on the same level, and they comprise 20 annular plate propers 30' of a predetermined thickness which are mounted rotatably and placed one upon another between the lower surface of the arms 9 along the outer surface of the large diameter portion of the center ring 18 and the annular flange 16 and an arm connecting projection 30" extended from a predetermined position on the outer surface of each plate proper 30', whereby the annular plate 30 in the uppermost position directly engages and supports selected on of the arms 9 (the bottom arm 9-1 in the illustration) by means of its projection 30" and the remaining 19 annular plates 30 have their projections 30" engaged with the remaining 19 arms 9 (the arms 9-②to 9-⑳in the illustration) through 19 level adjusting brackets 31 which are sequentially differering in height from one another, thus maintining the arms 9 on the same level.

Numeral 32 designates an elongated groove formed in the central back surface of the arm proper 19 of each arm 9 to engage a drive pin 34 of a geneva 33, and in the arm proper base portion the side walls of the elongated groove 32 are cut away to form an engagement initiating portion 35 so that the drive pin 34 can be brought into and out of engagement with the elongated groove 32 through the engagement initiating portion 35.

Numeral 10 designates a cylinder fitted in the cylinder receiving groove 21 of each arm 9, and the cylinder 10 is formed in a predetermined position on its inner wall with a slot 36 adapted to receive the outer peripheral edge of the unused arm connecting rotary plate 22. The previously mentioned slide contact member 11 is mounted by a pin 11' on the upper end (on the back side) of the cylinder 10 so as to detachably engage with the 2/3 arc groove 12 by the rotation of the arm 9, and the cylinder 10 is also formed in the lower end portion (the front side) with a spring receiving groove 37 in which is mounted a spring 38 having its one end pressed against the bottom of the groove 37 and its other end resiliently contacted with the inner bottom surface of the arm projection 24, thus always pressing the cylinder 10 against the frustum conical portion front wall 8. As a result. when each arm 9 is in the position of the bottom arm 9-①, the slide contact member 11 is pressed against the corresponding flat surface of the front wall 8 to hold the cylinder in that position, and when the arm 9 is rotated and moved from the bottom position to the position of the upper arms 9-②to 9-⑳ corresponding to the major arc guide groove 12, the cylinder 10 is slid toward the front wall 8 by the spring action of the spring 38 and the slide contact member 11 on the cylinder end is fitted in the guide groove 12.

Numeral 22 designates the unused arm connecting rotary plate formed with cylinder outer surface receiving arcuate grooves 39 arranged at the same pitch as the continuously arranged arms 9-②to 9-⑳, whereby the rotary plate 22 is engaged with the slots 36 of the cylinders 10 through the slots 23 formed in the arm projections 24 so that the rotary plate 22 is held out of engagement with the arm 9-① in the bottom position and its engaged with the remaining upper arms 9-② and 9-⑳ by the sliding movement of the cylinders 10 toward the front wall 8 which brings the outer surface of the cylinders 10 into engagement wih the arcuate groove 39, positively holding the upper arms 9-②to 9-⑳ in their positions.

Numeral 40 designates a slide contact member fitted by a locking bolt 41 in a predetermined position on the inner surface of the pawl piece holder 26 of each arm 9 so as to contact with the frustum inverted conival portion outer peripheral edge 25, and 42 a slide contact member fitted by a locking bolt 43 in a predetermined position on the end of the pawl pieces 28 so as to contact with the inner peripheral surface of the annular flange 7. In this way, the intermediate and outer end portions of each arm 9 can be smoothly rotated by the slide contact members 40 and 42 while being held on the same level.

Numeral 44 designates a drop or falling preventive pin provided at a predetermined position on the base of the arm 9 to project through the back surface, whereby when the arm 9 is moved to the left or right of the bottom arm 9-①, the pin 44 comes into contact with the horse-show peripheral edge of the geneva 33 to thereby more positively prevent the falling of the upper arms.

Numeral 45 designates an inverted triangular recess forming an arbor receiving space at a position on the base 5 corresponding to the annular groove 17.

Numeral 33A and 33B designate a pair of arm driving genevas which are symmetrically arranged between the arms 9 and geneva positioning supports 46 having bearings 46' fitted in the outer surface thereof and fixedly mounted at a predetermined position in the lower portion of the frustum inverted conical portion 6 and between the bottom arm 9-① and the arms 9-② and 9-⑳ arranged on both sides of the arm 9-① and spaced from the latter by a predetermined angle. Thus, when the genevas 33A and 33B make one rotation in the counterclockwise direction or clockwise direction, the arms 9-① to 9-⑳ are each moved by an amount corresponding to one arm in the counterclockwise or clockwise direction while maintaining the arrangement of FIG. 10. In other words, each geneva 33 comprises a base plate 49 formed at one end with a horse-shoe curved surface 47 adapted to contact with the falling preventive pins 44 and at the other end with a semicircular plate portion 48, a geneva turning gear 50 mounted on the outer surface of the bearings 46' at the back of the base plate 49, the roller-equipped drive pin 34 projected from the outer end of the horse-shoe portion of the base plate 49 and adapted to come into and out of engagement with the elongated groove 32 of the associated arm 9-② or 9-⑳ and to move along a path 51 in response to each rotation of the geneva 33A and 33B, respectively, in the same direction, and a crescent projection 52 having a vertical arcuated peripheral surface in front of the semicircular plate portion at a predetermined distance therefrom. In this case, by bringing a base outer surface 53 of the crescent projection 52 and the following semicircular base front face 54 into contact with each outer side edge of the arm 9-① as shown in the illustration, it is possible to possitively effect the delivery and positioning during the arm changing operation.

Numeral 55 designates a slide gear mounted on the back of the upper portion of the drum base 5 and disposed for engagement with a lower end gear 57 of a cylindrical cam 56 and a rotary shaft 58. Numeral 59 designates a bevel gear mounted on the lower end of the slide gear 55, and 60 a drive transmission unit having at one end a bevel gear 61 adapted for engagement with the bevel gear and at the other end a spur gear 62 whereby the geneva turning gear 50 is rotatable through a spur gear 63 which is in mesh with the spur gear 62.

The operation of the geneva unit 33 will now be described. When the genevas 33A and 33B are each forced to make one rotation from the rest position in FIG. 10 in the clockwise direction, the drive pin 34 engaged with the elongated groove 32 of the arm 9-⑳ starts rotating from the point of zero angular velocity and consequently its movement is started smoothly. As a result, the drive pin 34 is disengaged with the elongated groove 32 of the arm 9-⑳ and it is quickly moved toward the arm 9-① in its disengaged condition, after which the pin 34 is again decelerated to enter and engage with the elongated groove 32 of the arm 9-① and in this engaged condition the arm 9-① is moved to the position where the arm 9-⑳ previously was. On the other hand, the clockwise rotation of the geneva 33B moves the arm 9-②to the position at the bottom of the drum or the position where the arm 9-① previously was while being engaged with the geneva 33B, thus allowing the tool to be replaced with the new tool on the right side. In this case the other arms 9-③ to 9-⑳ are each moved in the clockwise direction by an amount corresponding to one arm so that the geneva 33A completes its one rotation while being engaged with the arm 9-① and geneva 33B completes its rotation by engaging with the arm 9-③.

On the other hand, when the genevas 33A and 33B are each caused to make one rotation in the counterclockwise rotation, the tool changing can be effected through an operation reverse to that effected by the clockwise rotation of the genevas. In other words, the counterclockwise rotation of the geneva 33B causes it to disengage with the arm 9-② and then engage with the arm 9-1 thus moving it to the position where the arm 9-② previously was and at the same time the geneva 33A engaged with the arm 9-⑳ is moved in this condition to the position where the arm 9-① previously was, thus allowing the tool to be replaced with the new one on the left side.

The same principle applied to cases where the genevas 33A and 33B are each caused to make a plurality of rotations continuously in the clockwise or counterclockwise direction. In other words, where the genevas 33A and 33B are each caused to make two rotations in the clockwise direction, for example, the first rotation of the genevas 33A and 33B moves the arm 9-①to the position where the arm 9-⑳ previously was and simultaneously the arm 9-② is moved to the position where the arm 9-① previously was. In response to the following second rotation of the genevas 33A and 33B in the clockwise direction the arm 9-② in the bottom position is moved to the position where the left-hand arm 9-① previously was and simultaneously the arm 9-③ is moved to the bottom position where the arm 9-② previously was, thus allowing the tool on the arm 9-① to be replaced with the new one on the arm 9-③ at a leap.

Numeral 64 designates a drive key way formed at a predetermined position in the outer surface of the arbor 27, and 65 a positioning top mounted by a spring-equipped pawl piece 66 on the forward end of the arm pawl piece holder 26 at a position corresponding to the drive key way 64, whereby when no tool is held by the arbor holding pieces 28 of the arm in the position below the drum 4, a lower end wall 67 of the head 1 is pressed against the back of the pawl piece 66 thus forcing the positioning top 65 out of the drive key way 64, and when a tool is held by the arbor holding pawl pieces 28 the positioning top 65 is engaged with the drive key way 64 by the resilient force of the spring thus accurately maintaining the indexing of the arbor 27. Numeral 68 designates a wedge provided on the lower end of the head 1 in opposition to and retractively with respect to the arbor holding pawl pieces 28, whereby when the wedge 68 is extended into engagement with the arbor holding pawl pieces 28, the pawls are forced to open and the grip on the tool is released. Numeral 69 designates a drive key formed in the lower end of the head 1.

Numeral 29 designates a main shaft or spindle mounted vertically at a predetermined position in the lower portion of the head 1, and a flared shank receiving portion is formed in the lower end of the main shaft 29. Numeral 70 designates a chuck mechanism fitted in the main shaft 29 so as to be vertically movable within a predetermined range, and it comprises an upper end main shaft head 71, an intermediate main shaft rod 70″, a chuck 70′ mounted on the rod lower end and adapted to be opened and closed by engaging and disengaging with the inner wall of the shank receiving portion and a flush spring mounted on the main shaft rod 70″ to urge the main shaft head upwardly, whereby when no pressing force is applied to the main shaft head 71, the chuck 70 comes into operation to grip the shank of the arbor 27 located below the drum 4, and when a downward pressing force is applied to the main shaft head 71 against the resilient force of the flush spring the arbor 27 is released, thus allowing the arbor 27 to be gripped by a double-action. A rotary drive transmission means 72 such as a gear is mounted on the main shaft 29.

The structure for bringing each arbor 27 into and out of engagement with the main shaft 29, comprises a press rod 74 disposed for vertical movement within the head 1 through a rotary shaft 73 provided above the main shaft 29, a disk portion 75 provided on the upper end of the press rod 74, a cam shaft 77 formed with a depression in a portion of its upper surface and adapted to be urged upwardly by a spring 78, a rotary member 79 fixedly mounted on the upper end of the rotary shaft 73 and roller means 80 engageable with the depression 76, whereby when the roller means 80 is engaged with the depression 76, the cam shaft 77 is moved upward by the resilient force of the spring 78 thus allowing the chuck 70 to grip the arbor, whereas when the roller means 80 is disengaged with the depression 76, the cam shaft 77 is moved downward against the resilient force of the spring 78 so that the main shaft head 71 is pressed downward and the arbor 27 is released.

Numeral 81 designates a gear mounted on the lower end of the rotary shaft 73 which is so disposed that its one end is connected to a motor 84 by way of an idle gear 82 and a motor shaft 83 and its other end is adapted for engagement with the slide gear 55 provided on the drum 4. Numeral 56 designates the cylindrical cam for vertically moving the drum 4, which is mounted rotatably on the rotary shaft 73 at a position above the gear 81, and roller means 85 which is projected from the base of the drum 4 is engaged with an inclined groove 56′ of the cam 56. Since the cam 56 is formed in its outer surface with the inclined groove gradually inclined from the highest position to the lowest position and then returns from the lowest position to the highest position and since the gear 57 engageable with the slide gear 55 is mounted on the lower end of the cam 56 at a predetermined distance from the lowest position of the inclined groove, when the rotary shaft 73 is rotated, at the same time that the geneva unit 33 starts rotating the cam 56 also starts rotating so that the drum 4 is moved downward from the illustrated highest position and at the same time the gear 57 of the cam 56 is disengaged with the slide gear 55 thus stopping the drum 4 at the lowest position and allowing only the geneva unit 33 to continue rotating. Numeral 86 designates an electromagnetic clutch mounted on the rotary shaft 73 at a position corresponding to the inner upper surface of the cylindrical cam 56, whereby with the drum 4 being stopped at the lowest position, when the clutch 86 is actuated as occasions demand so that is comes into engagement with the cylindrical cam 56, the cylindrical cam 56 is rotated again and the drum 4 is raised to the initial position. Numeral 87 designates a pair of guide rails projected from the front part of the head 1 and the drum 4 is vertically movable along the rails 87.

FIG. 14 shows an improved arm structure in which the arm projection is divided into the proper-side portion 24′ and a cover 24″ detachably mounted on the portion 24′, and this structure has the advantage of facilitating the mounting and demounting of the cylinder 10.

With this construction of the invention, when the tool is to be replaced by another, the head is first moved to a position where the tools are free of interference with the work and then the press rod is forced downward thus releasing the grip on the arbor. Then, in accordance with the position of the arm holding the desired tool the direction of rotation and the number of rotations of the genevas are determined to permit the selection of this particular arm with in a minimum period of time and thereby to accomplish the tool changing operation. Thus, where the arms are to be moved in the counterclockwise or clockwise direction by an amount corresponding to one arm, it is only necessary to operate the motor so that the cylindrical cam caused the drum to start its downward movement and at the same time the genevas start rotating, thus allowing, by one rotation of the genevas, the tool used to be quickly and accurately replaced wih the new one on the left hand or the right hand. On the other hand, where the arms are each to be continuously fed quickly by an amount corresponding to two or more arms, it is only necessary to simply cause the genevas each to make two or more rotations in the counterclockwise or clockwise direction continuously with the drum being stopped in the lowest position. Moreover, after the old and new tools have been changed with each other, by simply engaging the clutch the drum is easily raised to the initial position so that after the insertion of the new tool into the main shaft the press rod is actuated and the chuck grips the new tool, thus completing the tool changing.

With the construction described above, the present invention has a great practical advantage in that a large number of tools can be held and that any desired one of the tools can be positively selected in a minimum period of time, and the invention has another advantage that the operation of the genevas is such that the genevas are each rotated at a very low speed at the start of engagement with the arm and at the end of positioning and consequently the tool changing operation can be effected smoothly without causing any shock and the like.

Further, despite its ability to hold a large number of tools and to change the tool with any desired tool on its left or right side, the device of this invention is very simple in construction and compact, and moreover since falling preventing measures are doubly and trebly provided in that the arm having the arbor and engaged with the main shaft and the arms held in place on each side of the first-mentioned arm with a predetermined spacing therebetween, the rotary plate is engaged with the cylinders, the falling preventing pins are engaged with the genevas and so on to support one another, during the machining of the work there is no danger of the other arbors each holding a tool slipping down and a very high degree of safety is ensured.

We claim:

1. In an automatic tool changing device for machining centers including a movable head and a drum vertically movably mounted on said head, the improvement wherein said drum comprises: a base member disposed so as to be guided by guide means mounted on an outer end of said vertically movable head; a center shaft projected from an outer end central portion of said base member to slant downwardly; a large number of inverted angle shaped arms each thereof being mounted radially and rotatably in a predetermined position around said center shaft and including an arbor holding portion provided in the outer end portion thereof, an elongated groove provided in the base side central back surface thereof for engagement with a geneva drive pin and a cylinder projected from a predetermined position on the intermediate portion thereof for engagement with an unused arm connecting rotary plate; said unused arm connecting rotary plate having a plurality of semicircular grooves formed in the outer peripheral portion thereof and each being adapted to receive one of the cylinders of said arms arranged close to one another whereby when one of said arms is engaged with a main shaft provided in said head, the cylinders of the other ones of said arms are received and held by said semicircular grooves and said the other arms are continuously arranged above the position on each side of said one arm engaged with said main shaft which is spaced from said one arm by a predetermined angle; and a pair of genevas disposed symmetrically each so as to be positioned between said one arm engaged with said main shaft and adjacent one of said the other arms on each side of said one arm in the back thereof, each of said genevas including said arm moving drive pin adapted for selective engagement with the elongated grooves of said one arm and said adjacent one arm, whereby when said genevas are each caused to make one or plurality of rotations in a clockwise or counterclockwise direction said arms are each moved in said clockwise or counterclockwise direction by an amount corresponding to one or plurality of said arms while maintaining said arrangement.

2. A device according to claim 1, wherein said head comprises said main shaft mounted at a predetermined position in the lower portion thereof, said main shaft including chuck means provided at the lower end thereof for engagement and disengagement with one end of an arbor, a rotary shaft disposed vertically above said main shaft and including a gear mounted in a predetermined position on the lower end portion thereof, a drum supporting cylindrical cam rotatably mounted on said rotary shaft in a predetermined position above said rotary shaft gear, said cylindrical cam including a gear in a predetermined position on the lower end thereof, and a clutch mounted on said rotary shaft for re-turning said cylindrical cam, and wherein said drum further comprises a slide gear disposed in a predetermined position on the back of said base portion for engagement with said rotary shaft gear and said gear on the lower end of said cylindrical cam, and drive transmission means disposed to transmit a turning force of said slide gear to each of said genevas.

3. A device according to claim 1, wherein the cylinder of each said arm is vertically mounted so as to always be urged toward a front wall of said base member, said cylinder including slide contact means on the back portion thereof and a slot formed at a predetermined position in the intermediary inner side thereof for engagement with said unused arm connecting rotary plate, and wherein the outer end central portion of said drum base member includes an inverted frustum conical portion slanted downwardly, and said inverted frustum conical portion is formed at a predetermined upper position in an outer peripheral side front wall thereof with a major arc guide groove adapted for engagement with the slide contact means on the cylinder back portions of unused ones of said arms, whereby when the cylinders of said unused arms are engaged with said guide groove, said engaged cylinders are engaged with and held by said unused arm connecting rotary plate.

4. A device according to claim 1, wherein said drum base member is formed with an annular flange on the outer periphery thereof, wherein a cover is mounted on an outer end of said center shaft so as to form a front wall of said drum, wherein an arbor receiving space is defined between an inner peripheral edge of said annular flange and an outer peripheral edge of said cover, and wherein a base end of each said arm is supported by one of a plurality of support means rotatably mounted on said center shaft at a predetermined position around said center shaft so as to be pressed against the front wall of said inverted frustum conical portion, and an outer end of each said arm includes slide contact means adapted for contact with an inner surface of said annular flange and an outer peripheral edge of said inverted frustum conical portion.

* * * * *